United States Patent

Tsutsumi et al.

Patent Number: 5,794,126
Date of Patent: Aug. 11, 1998

[54] EMERGENCY POSITIONING INDICATING RADIO BUOY HAVING A THERMALLY INSULATED FREQUENCY STANDARD

[75] Inventors: Masayuki Tsutsumi; Kazuhiko Ono, both of Kouza-gun, Japan

[73] Assignee: Toyo Communication Equipment Co., Ltd., Kanagawa, Japan

[21] Appl. No.: 543,875

[22] Filed: Oct. 19, 1995

[30] Foreign Application Priority Data

Oct. 21, 1994 [JP] Japan ................... 6-282833

[51] Int. Cl.$^6$ ................................ H04B 13/02
[52] U.S. Cl. .............. 455/40; 455/128; 219/210; 331/69; 441/32
[58] Field of Search ................ 455/40, 41, 54.1, 455/66, 89, 90, 91, 92, 95, 127, 128; 361/679, 814; 219/209, 210; 441/11, 12, 13, 16, 17, 18, 32; 331/68, 69, 70

[56] References Cited

U.S. PATENT DOCUMENTS

| | | | |
|---|---|---|---|
| 3,329,981 | 7/1967 | Orsino | 441/18 |
| 3,906,370 | 9/1975 | Apps | 455/128 |
| 4,317,224 | 2/1982 | Neher | 455/128 |
| 4,611,182 | 9/1986 | Chauvin et al. | 219/210 |
| 4,981,453 | 1/1991 | Krishan et al. | 441/11 |
| 5,025,228 | 6/1991 | Gerard et al. | 219/210 |
| 5,076,103 | 12/1991 | Lagen et al. | 73/708 |
| 5,218,366 | 6/1993 | Cardamone et al. | 455/128 |

FOREIGN PATENT DOCUMENTS 406069815  3/1994  Japan ................... 455/40

Primary Examiner—Thanh Cong Le
Attorney, Agent, or Firm—Koda & Androlia

[57] ABSTRACT

An emergency positioning indication radio buoy used in case of emergency by being thrown into the sea from a ship. This radio buoy comprises a transmitting unit for generating a high frequency signal of a predetermined frequency, a battery for supplying the power to the transmitting unit, a switch which is normally breaking the power supply circuit from the battery to the transmitting unit and operates automatically or is operated by hand to make the circuit when the buoy is used, and an antenna for radiating the high frequency signal from the transmitting unit into the air, and is characterized by that at least the crystal resonator of said transmitter unit is put in a heat insulating container which is enclosed with a vacuum or a heat insulating material and that an antifreezing solution, oil or other appropriate material is filled in the heat insulating container. The radio buoy may further comprise a heating means disposed in the heat insulating container for generating heat when an electric current is made to flow through, a heat sensing and current controlling means for detecting temperature changes in the material filled in the heat insulating container and controlling the electric current flowing through the heating means, and a non-contact power receiving means for receiving the electric power from an external power source.

2 Claims, 6 Drawing Sheets

Prior Art

EMERGENCY POSITIONING INDICATING RADIO BUOY HAVING A THERMALLY INSULATED FREQUENCY STANDARD

BACKGROUND OF THE INVENTION

1. Field of the Invention

This invention relates to an emergency positioning indication radio buoy, and more specifically to an improved emergency positioning indication radio buoy which is carried on a ship to use in case of emergency by throwing it into the sea and begins to transmit the radio wave of a predetermined frequency automatically or switched on by hand when thrown into the sea.

2. Prior Art

Generally, in radio communication, the frequency of the radio wave transmitted by a transmitter and that of the local oscillation in a receiver must be kept within a permitted range of deviation from their predetermined set frequencies.

Therefore, conventional radio communications equipment uses a temperature-compensated crystal oscillator in order to keep the frequency of the transmitting radio wave or the local oscillation within a permitted range of deviation.

The conventional method of temperature compensation is, for example, to use a circuit element such as thermistor or variable capacitor whose resistance varies sharply with the temperature in the crystal oscillator or to connect a temperature-compensating circuit consisting of a thermistor and a capacitor connected in parallel, to the crystal resonator in series and thereby utilize the change of the equivalent reactance of the temperature-compensating circuit caused by temperature changes as the change of the capacitance of the load. These conventional methods can keep the frequency at most within about ±1 ppm against a temperature range of −30° C. to +75° C.

In the Navy Navigation Satellite System (NNSS), which receives the radio waves transmitted from satellites and measures the Doppler effect for positioning, a frequency stability of an output of a transmitter is dependent upon a frequency stability of a crystal oscilator. Therefore, the frequency stability of a crystal oscilator coused by temperature changes is important in order to maintain an output frequency of a transmitter.

In addition, there is an emergency signaling system using a radio buoy called Emergency Positioning Indication Radio Buoy (EPIRB) for positioning. EPIRB receives the radio waves transmitted from satellites and measures the Doppler effect as well as the NNSS described the above.

In this emergency signaling system using EPIRB, a radio buoy is carried on a ship or lifeboat and thrown into the sea in case of emergency. The buoy, when thrown into the sea, begins to operate automatically and transmits the radio wave of a predetermined frequency into the air. The satellite which receives the radio wave calculates the position of the radio buoy and transmits an emergency signal to the ground stations or marine stations. The frequency stability of the crystal oscillator buil in for transmission, especially the time rate frequency stability of the crystal oscillator is the problem.

The time rate frequency stability of the crystal oscillator is specified by the standard of the emergency signaling system, as follows for an emergency positioning indication radio buoy using 400-MHz band, for example:

Within $\pm 2 \pm 10^{-9}$ per 100 ms

Within $\pm 1 \pm 10^{-9}$ per second

Within ±1.4 kHz (it is equivalant to ±3.5 ppm) per year

An emergency positioning indication radio buoy is powered by a battery, and the operation for about 48 hours is specified.

To satisfy the requirements, an oven controlled crystal oscillator (OCXO) is employed for conventional emergency positioning indication radio buoy. This method of temperature compensation puts the crystal resonator in a thermostatic oven and controls the electric current flowing through a heating element such as Nichrome (registerd trademark) wire in the oven so as to keep the temperature in the oven within a range of, for example, +75° C. to +85° C., and monitoring the temperature.

FIG. 6 shows shows a block diagram of emergency positioning indication radio buoy of a prior art. The radio buoy is comprised of not only a transmitter 41 including a crystal oscillator and a temperature compensate circuit, an antenna 42, a battery 43, and a switch 44 which supplys an electric power to the transmitter 1 when the radio buoy 1 is thrown into the sea but also a control device 45 which controls the temperature compensate circuit of the transmitter 41 as shown in FIG. 6.

Therefore, the this conventional emergency positioning indication radio buoy has the following problems. The battery must supply the power to keep the oven within a required range of temperature not only for a relatively short time the buoy operates but also for the time until the buoy is used, possibly a long time, in addition to the power to operate the transmitter. Therefore, a battery of a higher voltage and a much larger capacity than those required to supply the power only to the transmitter must be used, and consequently the size, weight, and cost of the battery increase. Further, the power consumed varies depending on the environment in which the buoy is stored, there is the possibility that the battery runs down before the buoy is used.

SUMMARY OF THE INVENTION

The object of the present invention is to provide an improved emergency positioning indication radio buoy which has a simplified construction but does not need a battery of the high voltage and large capacity as required for the conventional emergency positioning indication radio buoy and thereby solve the above described problems of the prior art.

The above object is attained by the first emergency positioning indication radio buoy of the present invention which comprises a transmitting unit for generating and outputting a high frequency signal of a predetermined frequency, a battery as the power source, a switch which is normally breaking the power supply circuit from the battery to the transmitting unit and operates automatically or is operated by hand to make the circuit when the buoy is used, and an antenna for radiating the high frequency signal from the transmitting unit into the air, and is characterized by that at least the crystal resonator of the transmitter unit is put in a heat insulating container which is enclosed with a vacuum or a heat insulating material and that an antifreezing solution, oil or other appropriate material is filled in the heat insulating container.

The above object is better attained by the second emergency positioning indication radio buoy of the present invention which further comprises a heating means disposed in the heat insulating container for generating heat when an electric current is made to flow through, a heat sensing and current controlling for detecting temperature changes in the material filled in the heat insulating container and controlling the electric current flowing through the heating means.

and a non-contact power receiving means for receiving the electric power from an external power source said heat insulating container.

DETAILED DESCRIPTION OF THE INVENTION

Figure 1:
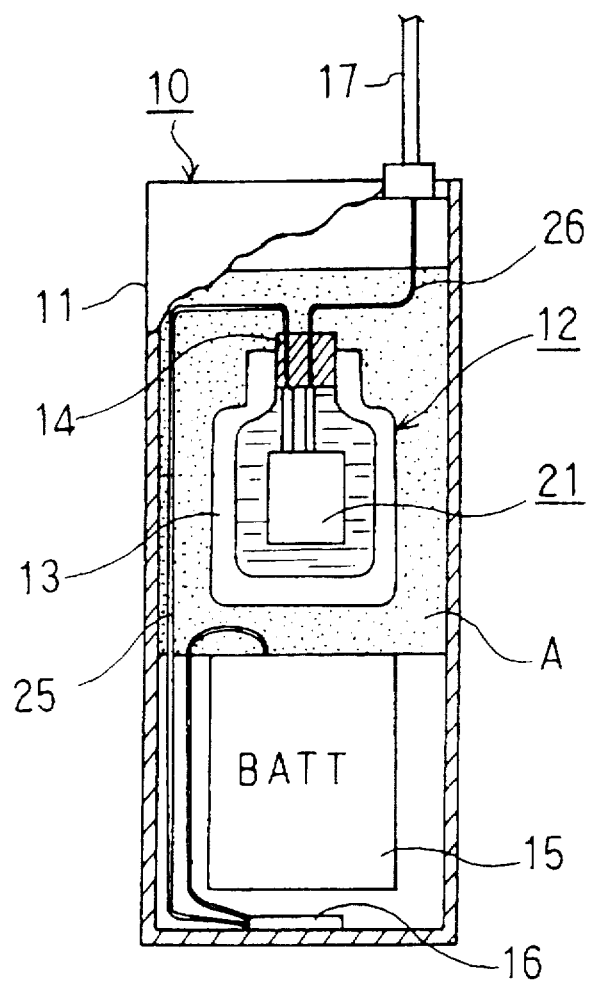
FIG. 1 is a diagrammatic sectional view which shows an embodiment of the first emergency positioning indication radio buoy of the present invention.
Figure 2:
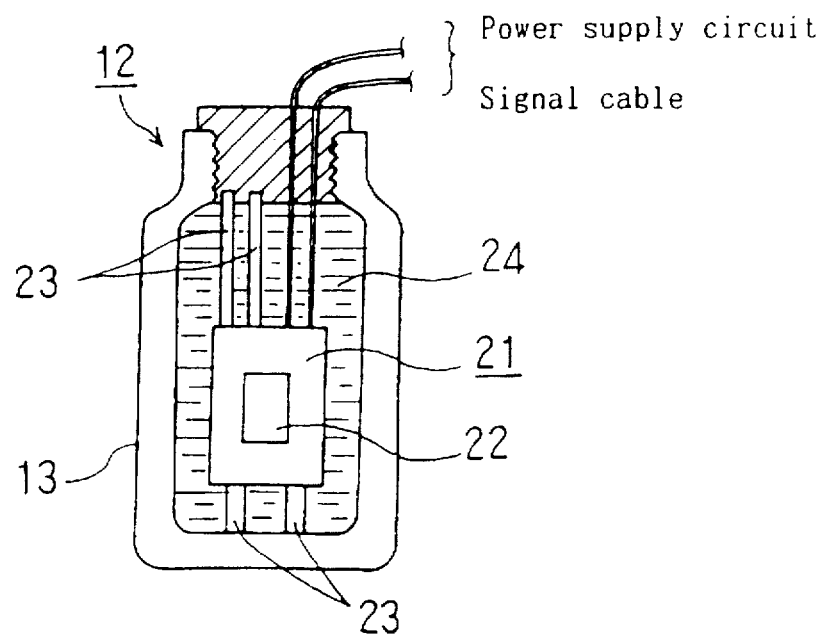
FIG. 2 is a diagrammatic sectional view of the heat insulating container of the embodiment of the first emergency positioning indication radio buoy shown in FIG. 1.
Figure 3:
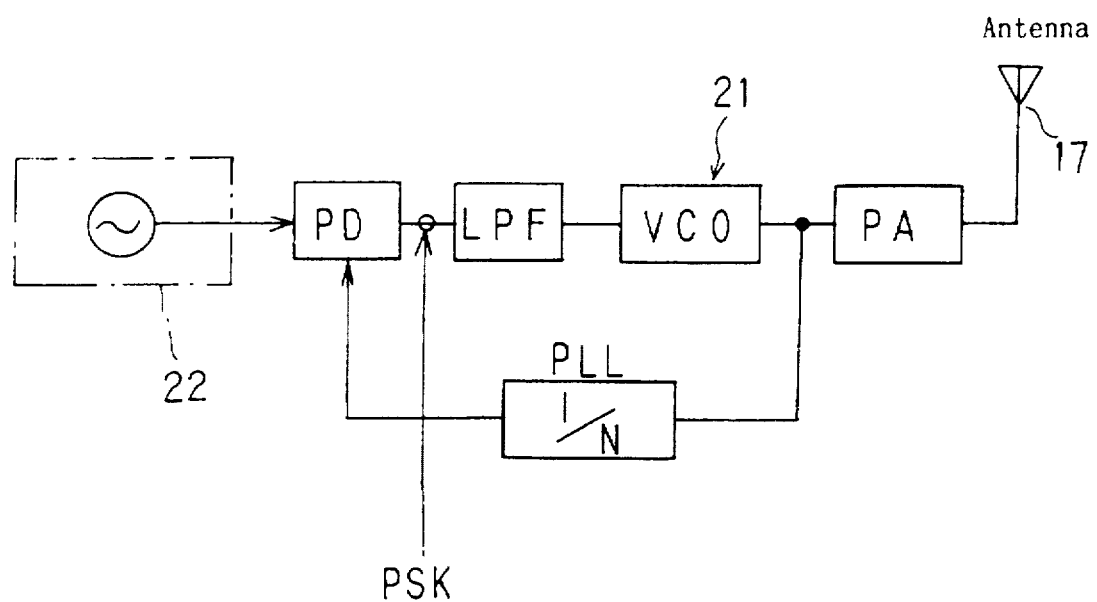
FIG. 3 is the block diagram which shows a construction of the electrical circuit of the first emergency positioning indication radio buoy of the present invention.

Referring now to FIGS. 1 to 3, a preferred embodiment of the first emergency positioning indication radio buoy of the present invention is described.

FIG. 1 is a diagrammatic sectional view which shows an embodiment of the first emergency positioning indication radio buoy of the present invention. FIG. 2 is a diagrammatic sectional view of the heat insulating container of the embodiment of the first emergency positioning indication radio buoy shown in FIG. 1. FIG. 3 is the block diagram which shows a construction of the electrical circuit of the first emergency positioning indication radio buoy of the present invention.

As known from FIGS. 1 to 3, the emergency positioning indication radio buoy 10, which is intended to be carried on a ship and thrown into the sea in case of emergency, comprises a watertight casing 11. In the upper part of the inside space of the casing 11, a heat insulating container 12 is held in a supporting material A. The heat insulating container 12 has a vacuum layer 13 which is formed in the hollow wall and encloses the inside space. The top opening of the heat insulating container 12 is sealed with a stopper 14 in a liquid-tight fashion. Instead of the vacuum layer 13, an appropriate heat insulating material may be used for heat insulation of the container 12.

In the lower part of the inside space of the casing 11, a battery 15 as the internal power source is disposed. A switch 16, which normally breaks the power supply circuit and makes it when the buoy is thrown into the sea by detecting seawater or the pressure of seawater, is attached on the bottom. An antenna 17 extending outside the casing 11 is disposed on the top of the casing.

For the structure for supporting the heat insulating container 12 in the casing 11, filling a heat insulating material such as styrene foam between the inside surface of the casing 11 and the container 12 as shown in FIG. 1 is preferable, because the supporting structure also serves for heat insulation.

In this embodiment, a whole transmitting unit 21 is sealed in a liquid-tight fashion and held in the heat insulating container 12 by appropriate supporting members 23. The heat insulating container 12 is filled with an nonfreezing oil 24. The transmitting unit 21 consists of, for example, a crystal oscillator 22, a phase detector (PD), a low pass filter (LPF), a voltage controlled oscillator (VCO), a power amplifier (PA), and a phase shift keying modulating signal generator (PSK) for supplying a PSK modulating signal between the phase detector.

The battery 15 and the transmitting unit 21 are connected by wires 25 for power supply via the switch 16 and through the stopper 14. The transmitting unit 21 and the antenna 17 are connected by a signal cable 26 through the stopper 14.

The material to fill in the heat insulating container 12 may be an antifreezing solution, nonfreezing oil, sol, gel, or solid (oil solidified by adding an additive, for example). A material with a large specific heat is preferable.

When this emergency positioning indication radio buoy 10 is thrown into the sea in case of emergency, the switch 16 automatically operates to make the power supply circuit. The power is then supplied from the battery 15 to the transmitting unit 21, and the radio wave begins to be transmitted from the antenna 17 into the air.

Since the inside of the heat insulating container 12 is highly heat-insulated from the outside environment by the supporting material A and the vacuum 13 and filled with a material with a large specific heat, the temperature of the inside of the heat insulating container 12 changes very slowly if the buoy is exposed to an abrupt large temperature change as when it is thrown into the very cold sea. Therefore, the time rate of change of the temperature of the crystal resonator of the transmitting unit 21 in the heat insulating container 12 is very small, and accordingly the change of the temperature of the crystal resonator while the buoy operates is within a very small range. As the result, the frequency of the oscillator is kept within a permitted range of deviation and a permitted range of time rate of change.

The first emergency positioning indication radio buoy of the present invention thus can satisfy the short time stability of the oscillation frequency by heat insulation without heating. Therefore, the battery 15 only has to supply the power to operate the transmitter unit 21, and the voltage of the battery 15 can be reduced to about 3 V instead of about 12 V required of the battery for the conventional radio buoy which has to supply the power to the heating element of the thermostat oven in addition to the transmitting unit 21. Accordingly, the capacity and hence the size, weight and cost of the battery 15 can be considerably reduced. This first emergency positioning indication radio buoy is suited for use in mild climate.

Though the entire transmitting unit 21 is put in the heat insulating container 12 in the above embodiment, the entire transmitting unit 21 must not necessarily be put in the heat insulating container 12. Instead, the crystal oscillator or the crystal resonator alone may be put in the heat insulating container 12, disposing the rest of the transmitter unit 21 outside the heat insulating container 12.

Further, though the emergency positioning indication radio buoy 10 of the embodiment is adapted for use at sea, the basic construction can be applied to other various emergency positioning indication by using an appropriate sensor or switch for the switch 16.

Next, an embodiment of the second emergency positioning indication radio buoy of the present invention is described.

Figure 4:
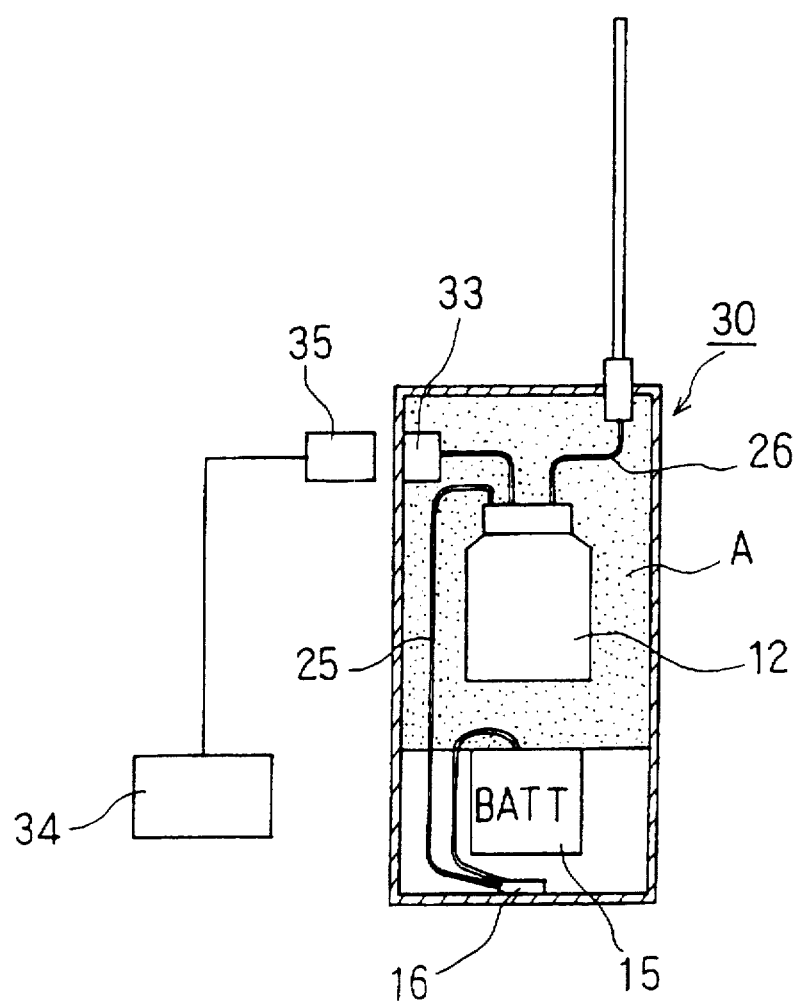
FIG. 4 is a diagrammatic sectional view which shows an embodiment of the second emergency positioning indication radio buoy of the present invention.
Figure 5:
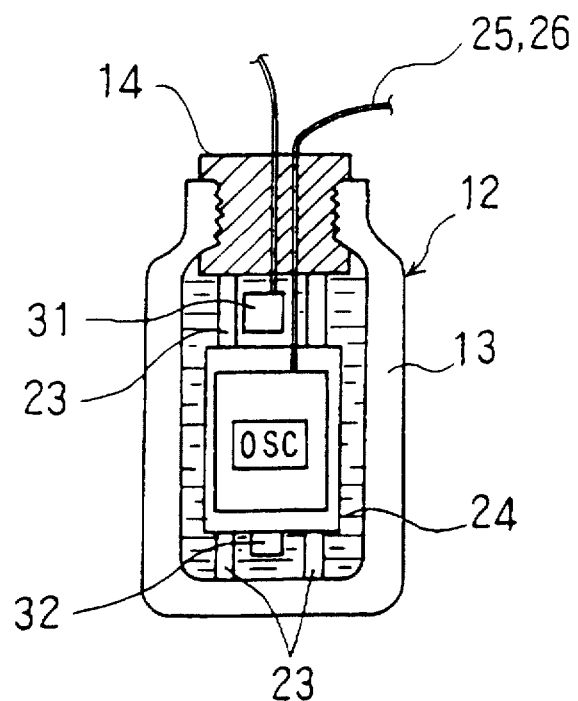
FIG. 5 is a diagrammatic sectional view of the heat insulating container of the embodiment of the second emergency positioning indication radio buoy shown in FIG. 2.
Figure 6:
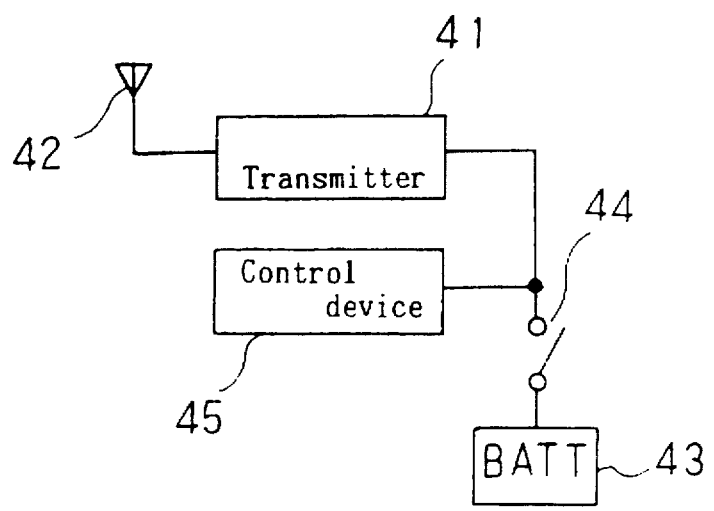
FIG. 6 is a block diagram of emergency positioning indication radio buoy of a prior art.

FIG. 4 is a diagrammatic sectional view which shows an embodiment of the second emergency positioning indication radio buoy of the present invention. FIG. 5 is a diagrammatic sectional view of the heat insulating container of the embodiment shown in FIG. 4.

As shown in FIGS. 4 and 5, the second emergency positioning indication radio buoy 30 of present invention further comprises, in addition to the construction of the above first embodiment, a heating element extending from the stopper 14 into the oil 24, a heat sensing and switching device 32 such as a thermostat, mounted on the transmitting unit 21 in this embodiment, for detecting the changes of the temperature of the oil 24 and switching on and off the current flow through the heating element 24 so as to keep the temperature of the oil 24 within a predetermined range, and a non-contact power receiving means 33 which is fixed on the inside surface of the casing 11 and receives the electric power from a non-contact power transmitting means 35 connected to an appropriate external power source 34 by a non-contact power transmission, for example, electromagnetic induction through the wall of the casing 11.

By this construction, the temperature of the oil 24 in the heat insulating container 12 is always monitored and kept within a predetermined range by heating the oil 24 with the electric power supplied from the external power source 34 if the temperature of the oil 24 decreases to a temperature at which the sensing and switching device 32 operates. Therefore, the temperature of the oil 24 is prevented from becoming too low if the buoy is exposed in a cold environment for a long time before it is used, and hence the frequency of the oscillator is kept within a permitted range of deviation. The second emergency positioning indication radio buoy 30 of this embodiment thus has a high long time frequency stability in addition to the sufficient short time frequency stability of the first emergency positioning indication radio buoy.

Since this second emergency positioning indication radio buoy of the present invention satisfies the long time stability of the oscillation frequency by heating with electric power supplied from an external power source, the battery 15 only has to supply the power to operate the transmitter unit 21 in case of emergency, and the voltage of the battery 15 can be reduced to about 3 V instead of about 12 V required of the battery for the conventional radio buoy which has to supply the power to the heating element of the thermostat oven in addition to the transmitting unit 21. Accordingly, the capacity and hence the size, weight and cost of the battery 15 can be considerably reduced, providing the buoy with a high long time frequency stability. Further, the possibility that the battery can run down before the buoy is used is eliminated. This second emergency positioning indication radio buoy is suited for use in cold climate.

Though a heat sensing and switching device 32 is used in the above embodiment, it may be separate heat sensing and switching devices.

Finally, it will be understood that the above preferred embodiments of the present invention are disclosed by way of example and that other modifications may occur to those skilled in the art without departing from the scope and the spirit of the present invention defined in the appended claims.

What is claimed is:

1. An emergency positioning indication radio buoy with heat insulating properties comprising a transmitting unit for generating a high frequency signal of a predetermined frequency, a battery for the transmitting unit, an antenna for radiating the high frequency signal generated by the transmitting unit into the air, and a heat insulating container which contains therein at least a part of said transmitting unit, characterized in that:

said heat insulating container is provided with an vacuum layer or an insulating layer inside a hollow wall thereof and further with a nonfreezing filling material therein, at least a crystal oscillator or a crystal resonator which is a part of said transmitting unit is disposed within said nonfreezing filling material, and a heat sensing means for detecting a temperature of said nonfreezing filling material in order to keep an inside temperature of said heat insulating container to be constant or to be substantially constant and a heating means for heating said nonfreezing filling material in response to a temperature detected by said heat sensing means by way of a non-contact power receiving means which receives an electric power from an external power source.

2. An emergency positioning indication radio buoy comprising a transmitting unit for generating a high frequency signal of a predetermined frequency, a battery for supplying the power to the transmitting unit, a switch which is normally breaking the power supply circuit from the battery to the transmitting unit and operates automatically or is operated by hand to make the circuit when the buoy is used, and an antenna for radiating the high frequency signal from the transmitting unit into the air; and at least the crystal resonator of said transmitter unit being put in a heat insulating container which is enclosed with a vacuum or a heat insulating material and an antifreezing solution, oil or other appropriate material being filled in said heat insulating container, characterized by further comprising a heating means disposed in said heat insulating container for generating heat when an electric current is made to flow through, a heat sensing and current controlling means for detecting temperature changes in the material filled in said heat insulating container and controlling the electric current flowing through the heating means, and a non-contact power receiving means for receiving the electric power from an external power source.

* * * * *